United States Patent [19]

Fujita

[11] Patent Number: 5,386,553
[45] Date of Patent: Jan. 31, 1995

[54] DISK FILE UPDATING CONTROL DEVICE AND METHOD USING UPDATING DATA STORED IN A FIRST-IN-FIRST-OUT QUEUE

[75] Inventor: Yuzo Fujita, Kanagawa, Japan

[73] Assignee: Fuji Xerox Co., Ltd., Tokyo, Japan

[21] Appl. No.: 595,217

[22] Filed: Oct. 10, 1990

[51] Int. Cl.$^6$ .......................................... G06F 13/14
[52] U.S. Cl. ................... 395/600; 395/425; 364/246.5; 364/DIG. 1
[58] Field of Search ............... 395/425, 725, 600, 575, 395/375

[56] References Cited

U.S. PATENT DOCUMENTS

| | | | |
|---|---|---|---|
| 3,969,723 | 7/1976 | Kennicott | 364/188 |
| 4,077,059 | 2/1978 | Cordi | 395/600 |
| 4,189,773 | 2/1980 | O'Meara | 395/375 |
| 4,195,340 | 3/1980 | Joyce | 395/425 |
| 4,432,057 | 2/1984 | Daniell et al. | 395/725 |
| 4,507,751 | 3/1985 | Gawlick | 395/575 |
| 4,593,354 | 6/1986 | Ushiro | 395/425 |
| 4,631,673 | 12/1986 | Haas et al. | 395/600 |
| 4,686,620 | 8/1987 | Ng | 395/600 |
| 4,888,681 | 12/1989 | Barnes | 395/600 |
| 4,912,637 | 3/1990 | Sheedy | 395/600 |
| 4,916,605 | 4/1990 | Beardsley et al. | 395/425 |
| 5,089,958 | 2/1992 | Horton et al. | 395/575 |

Primary Examiner—Thomas G. Black
Assistant Examiner—Jennifer M. Orzech
Attorney, Agent, or Firm—Finnegan, Henderson, Farabow, Garrett & Dunner

[57] ABSTRACT

In a disk file control device in which updating data output by a data processing section is temporarily stored in a FIFO queue to update a file, the updating data has a data structure which includes an operation code representing a type of updating operation such as a data inserting, removing or updating operation, and amount-of-data information indicating an amount of data to be subjected to the type of updating operation. The type of operation is determined from a given operation code and is used to change the size of file to be updated by as much as an amount of data obtained from the amount-of-data information, and thereafter the data stored in the FIFO queue is transferred into the file thus changed. Alternatively, the type of operation is used to change the size of the original file to be updated to provide a new file, and the data of the original file and the FIFO queue are transferred into the new file.

2 Claims, 6 Drawing Sheets

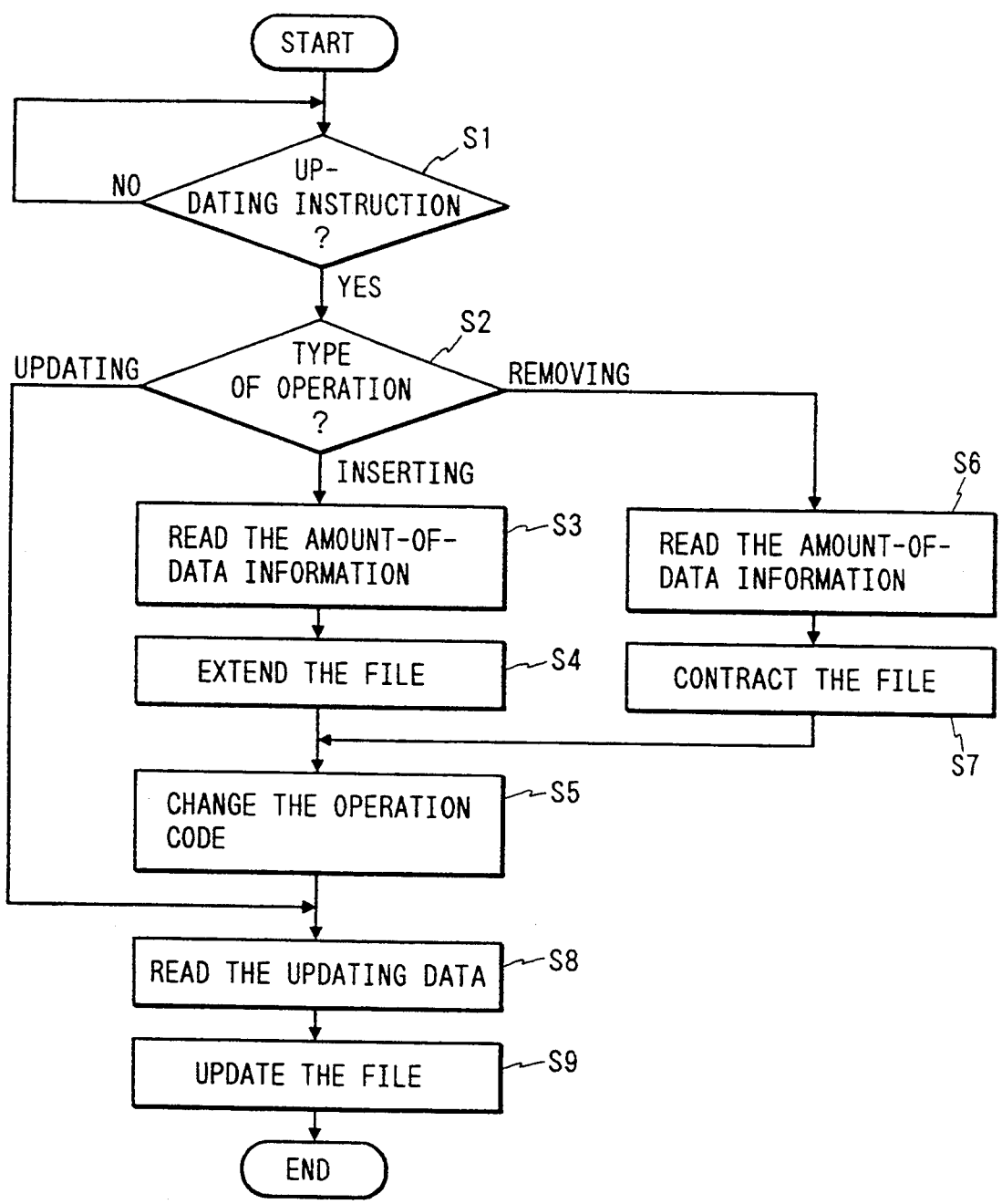

DISK FILE UPDATING CONTROL DEVICE AND METHOD USING UPDATING DATA STORED IN A FIRST-IN-FIRST-OUT QUEUE

BACKGROUND OF THE INVENTION

1. Field of the Invention

This invention is related in general to updating data in a disk memory unit and, more particularly, to an improved disk file control device and disk file control method.

2. Background of the Invention

It is known in the art to provide a disk memory unit (hereinafter referred to as "a disk unit", when applicable), with a fixed disk as a memory medium, as a peripheral device of a data processing unit such as a computer or work station. The disk unit is adapted to store data such as data prepared by the data processing unit, software and microcodes necessary for the operation of the data processing unit, and character patterns.

Of the data described above, the data formed by the data processing unit are transferred to the disk unit while being processed, so that a file in the disk unit is updated.

In the case where the system including the data processing unit and the disk unit is inactivated, for example by the interruption of the power supply (hereinafter referred to as a "system interruption", when applicable) before updating of the file is accomplished, data inputted after the system is activated again are sometimes inconsistent with that which had already been stored in the file.

One conventional technique for obviating this difficulty is described as follows with reference to FIGS. 9 and 10. FIG. 9 is a diagram showing an updating method for preventing the occurrence of the above-described data inconsistency.

As shown in FIG. 9, a data processing section 1 includes a volatile memory 2. The data formed by the data processing section 1 and stored in the volatile memory 2 is transferred to an FIFO queue 3 made up of a non-volatile memory. With the data thus stored in the FIFO queue 3, a file in a disk unit 4 is updated.

As was described above, the data formed by the data processing section is first transferred to the FIFO queue 3 into which data is written at a relatively high speed, and is then transferred to the file in the disk unit 4 in which data is written at a relatively low speed.

As a result, the probability is relatively low that a system interruption may occur while data is being written into the FIFO queue 3, because the data is written into the FIFO queue 3 at a relatively high speed. In contrast, data is transferred from the FIFO queue 3 to the file in the disk unit 4 at a relatively low speed. Therefore, the probability is relatively high that a system interruption may occur while data is being written into the file in the disk unit 4. However, even if a system interruption occurs during updating of the disk unit 4, the data will not be erased because the FIFO queue 3 has the non-volatile memory. Hence, upon reactivating the system, the data remaining in the FIFO queue 3 can again be transferred to the file in the disk unit 4. In such a case, the data written into the file in the disk unit 4 will be consistent with the data remaining in the FIFO queue 3.

The structure of the data stored in the FIFO queue 3 is shown in FIG. 10. The data stored in the FIFO queue 3 includes file identification data 5, and file page references 6-1 through 6-n. The file identification data is a symbol or name used to distinguish the particular file from others. The data written in each file page reference are data to be updated for the particular file page, and the position in the file where the data is written.

The structure of the data stored in the FIFO queue 3 is as described above. Therefore, upon reactivating the system after a system interruption, the data stored in the FIFO queue 3 are written in place in the file according to the data in the file page references.

Thus, the above-described updating method can prevent the undesirable result of the contents of the file becoming unacceptable upon reactivating the system after a system interruption.

However, the above-described conventional technique suffers from the following difficulties. The structure of the data formed in the FIFO queue 3 has no designating data necessary for extension or contraction of the file in the disk unit 4. As a result, extension or contraction of the file cannot be carried out, such file extension or contraction being necessary for an updating operation accompanied by an insertion or removal of data.

As a result, the above-described conventional technique can only perform an updating operation with the file remaining fixed in size. In other words, the conventional technique is applicable only to an updating operation which is not accompanied by data insertion or removal.

SUMMARY OF THE INVENTION

It is, therefore, an object of the present invention to eliminate the above-described difficulties accompanying a conventional updating method.

It is another object of the invention to provide a disk file control device which enables data in a file, in a disk unit, to be renewed or removed from the file, or data to be inserted into the file, without the contents of the file becoming unacceptable.

It is a further object of the invention to provide a method for updating data in, removing data from or inserting data into a file in a disk unit of a data processing unit, without the contents of the file becoming unacceptable.

Additional objects and advantages of the invention will be set forth in part in the description which follows, and in part will be obvious from the description, or may be learned by practice of the invention. The objects and advantages of the invention may be realized and attained by means of the elements and combinations particularly pointed out in the appended claims.

To achieve the objects and in accordance with the purposes of the invention, as embodied and broadly described herein, there is provided a disk file control device in which updating data output by a data processing section is stored in an FIFO queue including a non-volatile memory, and is used to update a file. The updating data has a data structure including an operation code representing a type of updating operation such as a data inserting, removing or updating operation, amount-of-data information indicating an amount of data to be subjected to the type of updating operation, and a file page containing data for writing into the disk file for updating. The disk file control device includes means, operatively coupled to the FIFO queue, for determining a type of updating operation according to the operation code in the data structure; means, operatively coupled to the type determining means and the disk file, for changing the size of the disk file according to the determined type of updating operation, and by the amount obtained from the amount-of-data information; and means, operatively coupled to an output of the changing means and to the FIFO queue, for reading out the data stored in the file page of the FIFO queue into the disk file after the size of the file has been changed.

There is also provided in accordance with the invention a disk file control device in which updating data output by a data processing section is stored in an FIFO queue including a nonvolatile memory, and is used to update a disk file. The updating data has a data structure including an operation code representing a type of updating operation such as a data inserting, removing or updating operation, amount-of-data information indicating an amount of data to be subjected to the type of updating operation, and a file page containing new data for writing into the disk file for updating. The disk file control device includes means, operatively coupled to the FIFO queue, for determining the type of updating operation according to the operation code in the data structure; means, operatively coupled to the type determining means and the disk file, for defining a new disk file, said new disk file having a size substantially equal to that of an original disk file changed according to the determined type of updating operation and by an amount determined from the amount-of-data information; and means for transferring the data of the original file and the file page of the FIFO queue into the new file.

Further in accordance with the invention there is provided a method for performing an updating operation of a disk file in accordance with updating data output by a data processing section, the updating data being a data inserting, removing or updating operation. The data processing section stores updating data in a FIFO queue, the updating data having a data structure including an operation code, amount-of-data information and a file page. The operation code represents the type of updating operation to be performed, the amount-of-data information represents an amount-of-data to be subjected to the updating operation, and the file page contains data for writing into the disk file for updating. The method includes the steps of determining in accordance with the operation code the type of data updating operation to be performed; changing a size of the disk file according to the type of updating operation to be performed and the amount of data represented by the amount-ofdata information; and reading out the data stored in the file pages of the FIFO queue for writing into the disk file.

In accordance with a further embodiment of the method of the invention, the method includes the steps of determining in accordance with the operation code the type of updating operation to be performed; defining a new disk file having a size substantially equal to that of an original disk file changed according to the determined type of updating operation, and by an amount determined from the amount-of-data information; and transferring data of the original file and the file page of the FIFO queue into the new file.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention.

FIG. 5 is a flow chart for a description of the operation of the first embodiment of the invention;

DETAILED DESCRIPTION OF THE PREFERRED EMBODIMENTS

This invention will be described with reference to the accompanying drawings in detail.

Figure 2:
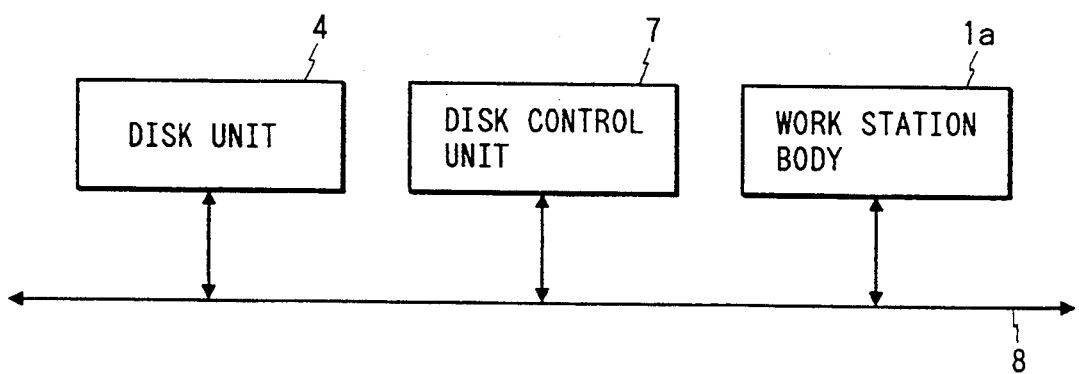
FIG. 2 is a block diagram showing an arrangement of elements in the first embodiment.

FIG. 2 is a block diagram showing an arrangement of a work station for a first embodiment of the invention.

As shown in FIG. 2, the work station includes a work station body 1a, a disk unit 4 for storing data formed by the work station body 1a and for storing a variety of data files of software, microcodes and character patterns required for the operation of the work station, and a disk control unit 7 for controlling the transmission of data to and from the disk unit 4. Work station body 1a, disk unit 4 and disk control unit 7 are connected with one another through a common transmission path 8. Generally, work station body 1a comprises essential work station elements such as a main memory, a central processing unit, an input/output unit, etc.

Figure 3:
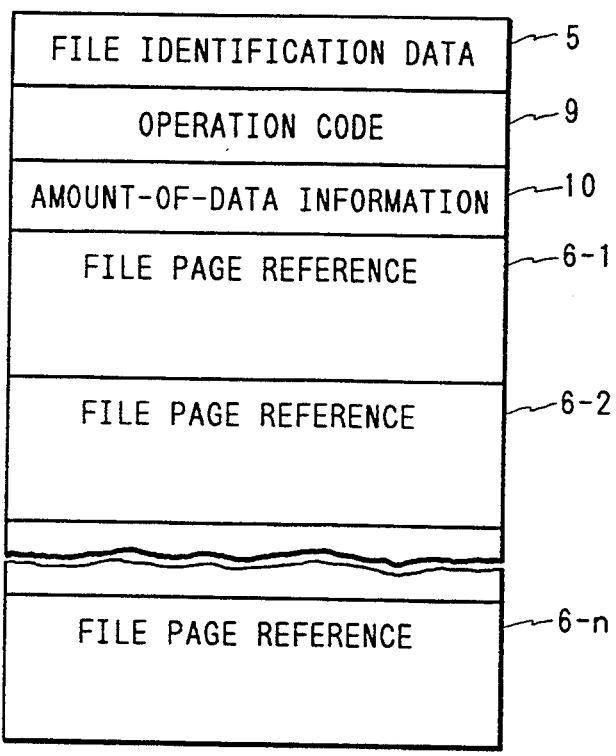
FIG. 3 is an explanatory diagram showing the structure of updating data.
Figure 10:
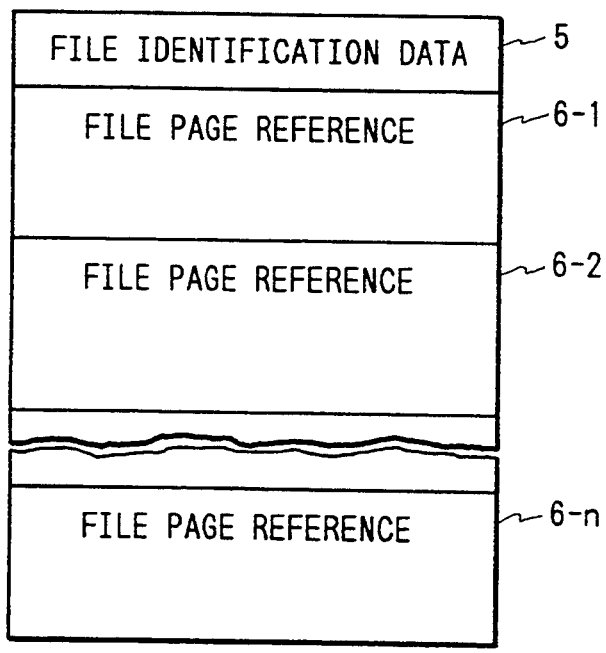
FIG. 10 is an explanatory diagram showing a data structure for updating data in accordance with the conventional file updating method.

The structure of data stored in FIFO queue 3 (FIG. 1) and written into the disk unit 4 by the work station body 1a is described with reference to FIG. 3, in which those elements which have been described with reference to FIG. 10 are designated by the same reference characters. As seen in FIG. 3, the data structure includes file identification data 5 and an operation code 9 which is data added for identification of the types of data updating operations such as the insertion, removal and renewal of data. The data structure also includes amount-of-data information 10 which indicates the amount of data which is added or removed according to the above-noted types of operation, and file page references 6-1 through 6-n.

Figure 1:
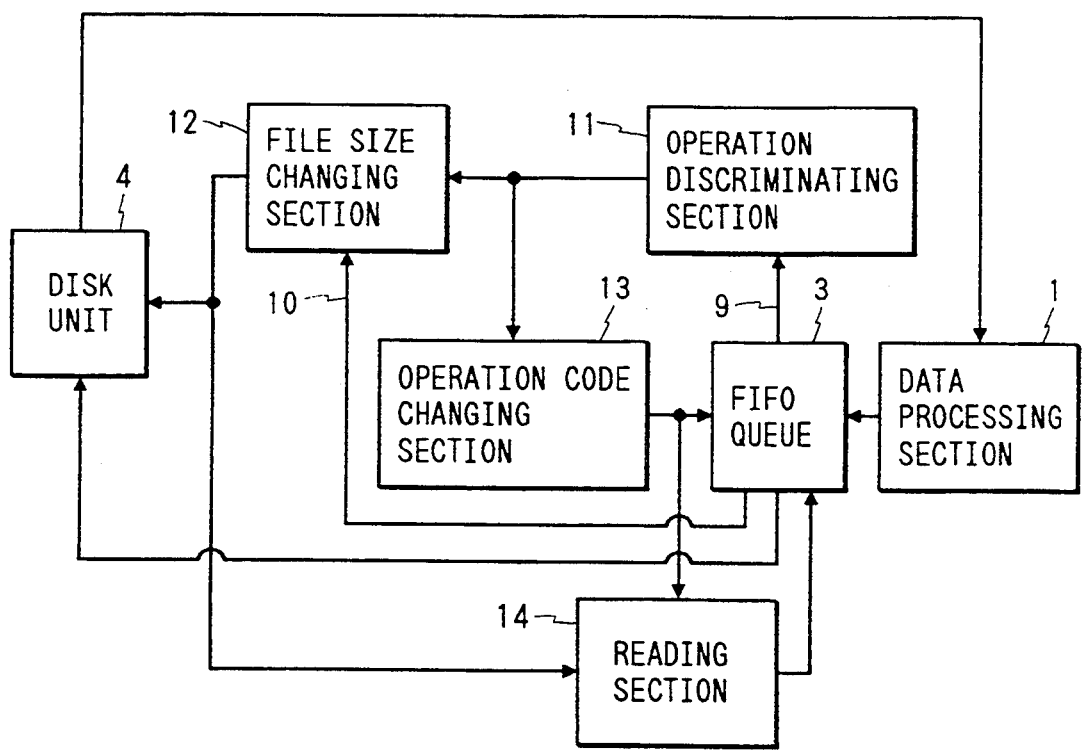
FIG. 1 is a block diagram showing the functions of a first embodiment of the invention.

The functions of the various elements in the first embodiment, including elements of the disk control unit 7, are described with reference to FIG. 1. As seen in FIG. 1, a data processing section 1, which is part of the work station body 1a, operates to read data from a file in the disk unit 4, and process them. In accordance with the result of the data processing operation, data processing section 1 writes data for updating the file in the FIFO queue 3 which is preferably a part of the disk control unit 7. The data written in the FIFO queue 3 has the data structure as described above with reference to FIG. 3. An operation discriminating section 11 of the disk control unit 7 reads the operation code 9 from the FIFO queue 3 to identify the type of updating operation. The result of identification by the operation discriminating section 11 is applied to a file size changing section 12 of the disk control unit 7. In response, the file size changing section 12 provides as an output signal data to the disk unit 4 to change the area (size) of the file in the disk unit 4. The change in the size of the file is determined according to the amount-of-data information 10 read by the file size changing section 12 from the FIFO queue 3.

The result of identification by the operation discriminating section 11 is further supplied to an operation code changing section 13 of the disk control unit 7. In the case that the result of identification indicates "inserting" or "removing" data, the operation code changing section 13 applies an operation code changing signal to the FIFO queue 3 to change the operation code to that for "updating", after the extension or contraction of the file has been completed. In response to this signal, the operation code 9 stored in the FIFO queue 3 is changed to the "updating" operation code.

The operation code changing signal provided by operation code changing section 13 is further applied to a reading section 14 of the disk control unit 7. The output signal of file size changing section 12 is also applied to the reading section 14. In response to these signals, the reading section 14 provides a read-out signal (shift-out signal) which is applied to the FIFO queue 3. Upon reception of the shift-out signal, the FIFO queue 3 applies data to the disk unit 4, as a result of which the concerned file in the disk unit 4 is updated.

The aforementioned file updating operation will be described in greater detail with reference to FIGS. 4(a) through 4(d).

Figure 4A:
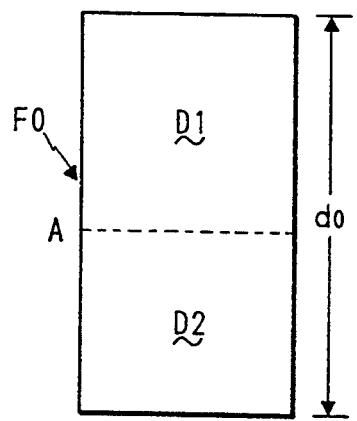
FIGS. 4(a), 4(b), 4(c), 4(d) are explanatory diagrams for a description of the extension of a file, and the insertion of data.

An example in which data D is being inserted in a file at the position A is described. As shown in FIGS. 4(a) and 4(d), the amount of the data D is d, the size of a file F0 is d0, and data D1 and D2 have been stored before and after the position A, respectively.

Figure 4B:
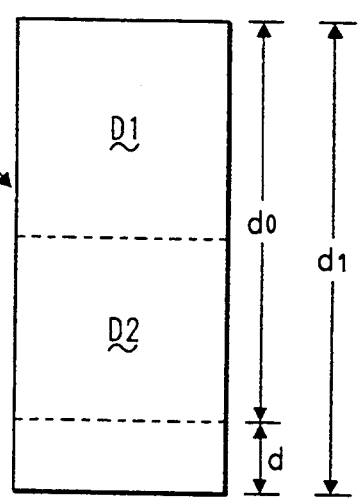

In order to insert the data D into the file at the position A, the file F0 is extended to obtain a disk area large enough to insert the amount d of data, as shown in FIG. 4(b). That is, the file F0 is extended to create a file F1 which has a disk area large enough to additionally store the data D.

In this example in which the data D is being inserted in the disk area thus extended, the operation code 9 to be stored in the FIFO queue 3 is set to "insertion", and the amount-of-data information 10 is set to the value d. The data inserting position A, updating data D to be inserted, and data D2 stored in the original file after the data inserting position A, are written, for instance, in the file page reference 6-1 of the FIFO queue 3.

The data D1 and D2 in the file are those which are read from the disk unit 4 into the data processing section 1 so as to be processed there. The data D2 is stored in the FIFO queue 3 after the data inserting position A has been recognized by the data processing section 1. Therefore, the data D2 together with the data D to be inserted and the data inserting position A can be stored by the data processing section 1 in the FIFO queue 3.

Figure 4C:
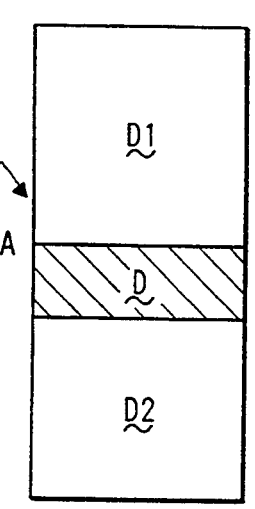
Figure 4D:
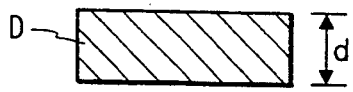

Thus, the data D to be inserted and the data D2 stored after the data inserting position A are stored in the file page reference 6-1. Using these data, the data stored after the position A are updated, as a result of which the data D is inserted into the file at the data inserting position A as shown in FIG. 4(c).

An example in which a certain amount of data is to be removed from the file in the disk unit 4 is considered next. It is assumed that the certain amount of data is to be removed from the data D2. The data stored after the location in the file where the data is to be removed, i.e., the data obtained as a result of removing the certain amount of data from the data D2, is stored by the data processing section 1, for instance, in the file page reference 6-1 of the FIFO queue 3. Thereafter, the file is contracted by an amount equal to the amount of data being removed, and the data stored in the file page reference 6-1 is used to update the data located in the file after the location of the data being removed. As a result, the predetermined certain amount of data is removed from the file.

The above-described operations performed in accordance with the first embodiment of the invention are further described with reference to a flow chart of FIG. 5.

In Step S1, it is determined whether or not an updating instruction has been issued by the data processing section 1. When it is determined that the updating instruction has been issued, Step S2 is effected. In Step S2, the type of updating operation is identified according to the operation code 9 stored in the FIFO queue 3. That is, one of the inserting, removing and updating operations is identified.

In the case where the inserting operation is identified, Steps S3 and S4 are performed. Step S3 is effected to read the amount-of-data information 10 in the FIFO queue 3.

In Step S4, the file is extended according to the amount-of-data information thus read.

In the case where the removing operation is selected, Steps S6 and S7 are performed. Step S6 is effected to read the amount-of-data information.

In Step S7, the file is contracted or reduced according to the amount-of-data information thus read.

After the file has been extended or contracted, Step S5 is effected. In Step S5, the operation code is changed so that the type of operation is set to "updating".

In Step S8, the updating data stored in the FIFO queue 3 is read.

In Step S9, the file is updated with the data read from the FIFO queue 3.

When, in Step S2, it is determined that the type of operation is "updating", then the operation advances to Step S8, so that the updating data is read immediately.

In the above-described first embodiment, after the size of the file is changed, the operation code is set to "updating" because of the following reason. If the operation code remains as "inserting" or "removing", then when a system interruption occurs after the file size is changed, the file size would, incorrectly, be changed again according to the operation code after the system is reactivated. This difficulty is overcome by changing the operation code to the "updating" operation code after the change of the file size.

A second embodiment of the invention is described next.

In the above-described first embodiment, in order to insert or remove data from the file, the data to be inserted and the data located after the data inserting or removing position in the file are stored in the FIFO queue 3.

In accordance with the second embodiment of the invention, in order to insert data into the file, only the data to be inserted is stored in the FIFO queue 3, with the same results as those achieved by the first embodiment.

The functions of the various elements of the second embodiment of the invention are described with reference to FIG. 6, in which those elements which have been already described with reference to FIG. 1 are designated by the same reference numerals.

Figure 6:
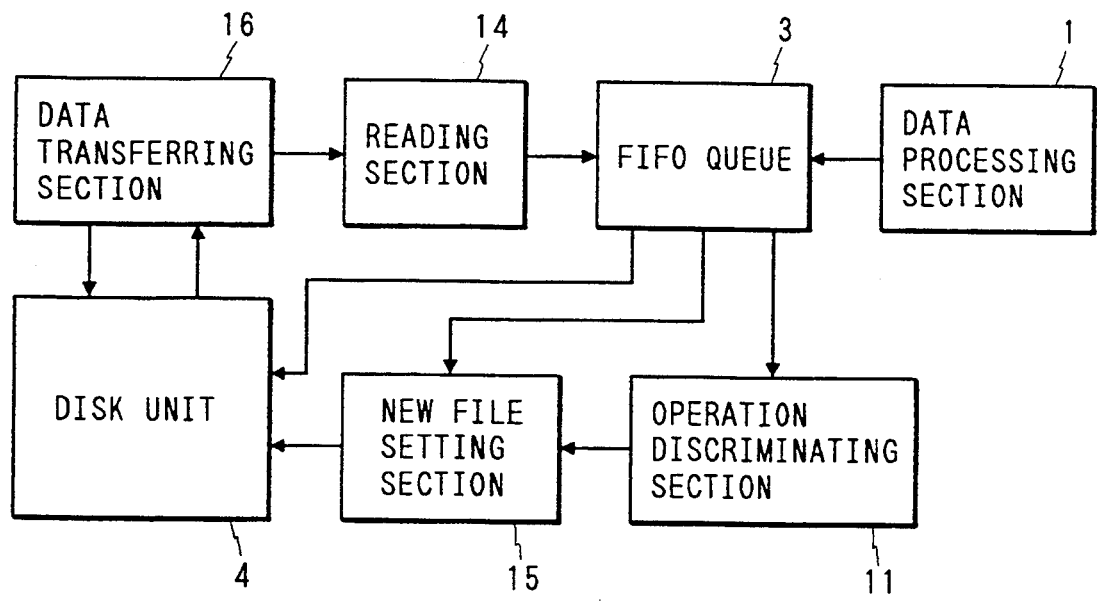
FIG. 6 is a block diagram showing the functions of a second embodiment of the invention.

In FIG. 6, the operation discriminating section 11 is coupled to receive the operation code 9 from the FIFO queue 3. The type of operation which the operation discriminating section 11 has identified according to the operation code 9 stored in the FIFO queue 3, and the amount-of-data information 10 stored in the FIFO queue 3 are applied to a new file setting section 15. The disk unit 4 is coupled to receive from the new file setting section 15 an output instruction signal for setting a new file in the disk unit 4 according to the type of operation and the amount-of-data information.

In response to the instruction signal from the new file setting section 15, a file is newly defined in the disk unit 4 to have the size determined by respectively adding or subtracting the area corresponding to the amount-of-data information to or from the file size of the page specified by the file page reference, according to whether data is being inserted or removed.

A data transferring section 16 is coupled to the disk unit 4 and operates to transfer the data of the original file in the disk unit 4 to the newly defined file. The data transferring section 16 is also coupled to apply a signal to the reading section 14 with predetermined timing. In response to the signal from the data transferring section 16, the reading section 14 supplies the shift-out signal to the FIFO queue 3. As a result, the FIFO queue 3 applies updating data to the disk unit 4. The data is inserted in the new file in the disk unit 4.

Figure 7:
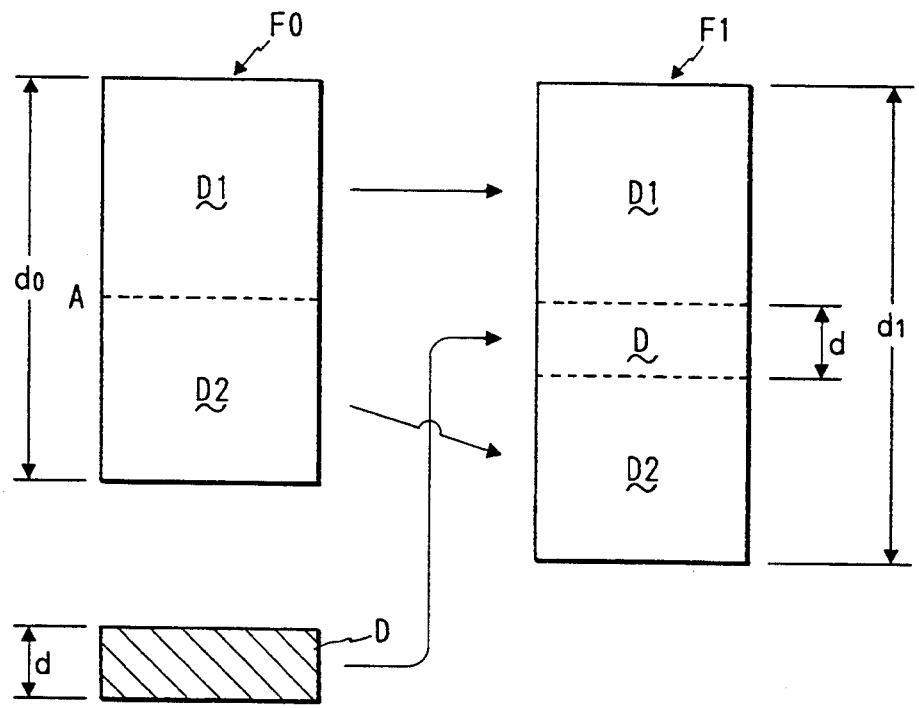
FIG. 7 is an explanatory diagram for a description of a method of updating a file in accordance with the second embodiment.

As an example, insertion of data D in the original file F0 at the position A in accordance with the second embodiment of the invention will be described with reference to FIG. 7.

It is assumed that the amount of the data D to be inserted is d, the size of the original file is d0, and the data D1 and D2 are stored before and after the position A, respectively.

In response to the instruction signal from the new file setting section 15, a new file F1 is defined in the disk unit 4 which has the size d1 large enough to store the data D1, D2 and D.

When the new file F1 has been defined in this manner, the data transferring section 16 accesses the disk unit 4 to transfer the data D1 from the file F0 to the new file F1 beginning at the top of the data. Upon completion of the transfer of data D1, the data D is read out of the FIFO queue 3 and written into the file F1. Thereafter, data transferring section 16 accesses the disk unit 4 to transfer the data D2 to the new file F1.

Similarly, in the case of removing data from the original file, a new file is defined in the disk unit 4 which is contracted in size according to the amount of the data being removed. First, the data D1 located before the data removing position A is transferred to the new file, and the data resulting from removing a certain amount of data, that is, the data whose amount is indicated or expressed by the amount-of-data information, from the data D2 is transferred to the new file. As a result, the file is updated.

In accordance with the second embodiment of the invention, in the case of inserting data into the file, the data to be inserted is stored in the file page reference of the FIFO queue 3. In the case of removing data from the file, only the positional information on the file where the data to be removed is located is stored in the file page reference of the FIFO queue 3.

Figure 8:
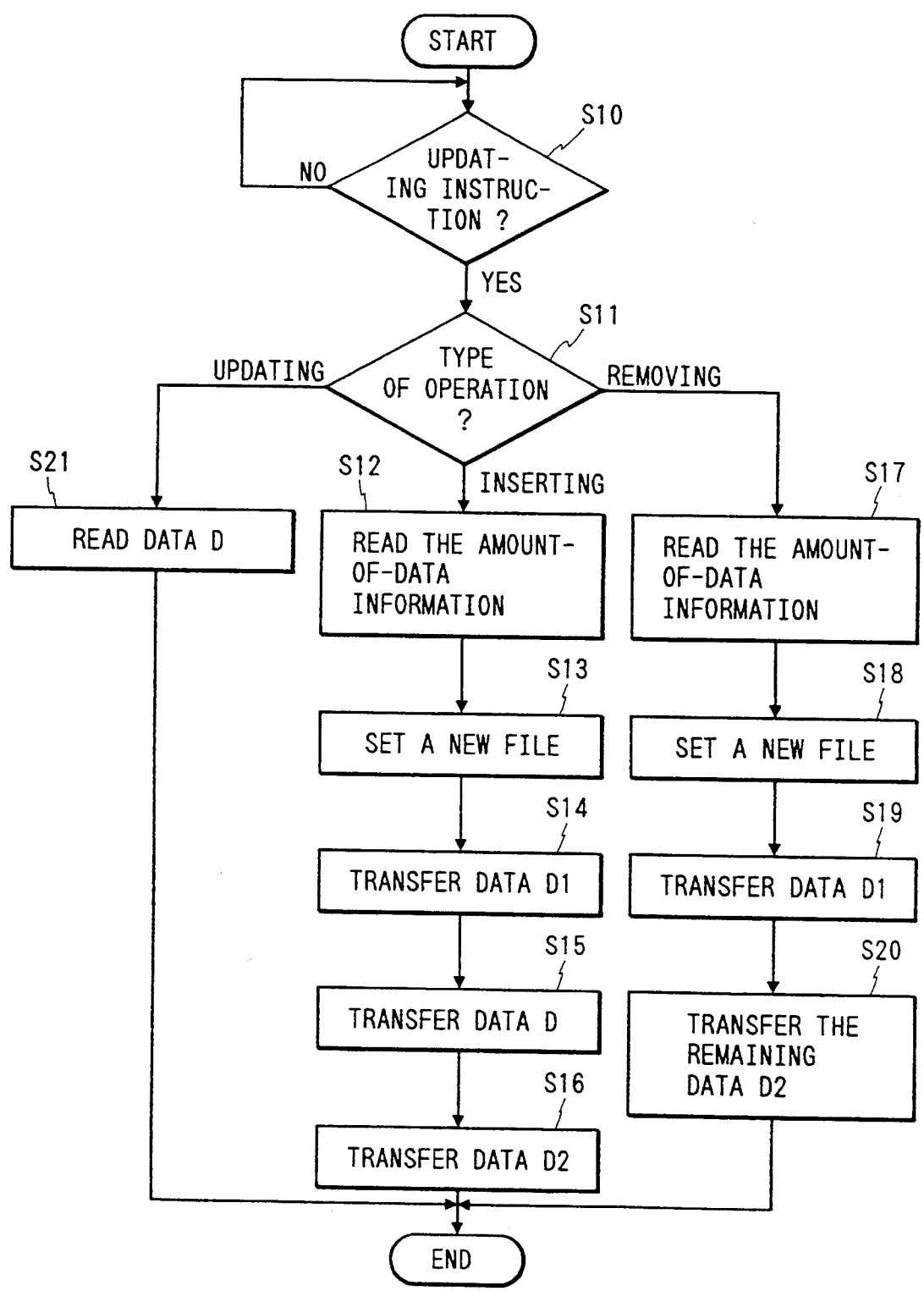
FIG. 8 is a flow chart for a description of the operation of the second embodiment.
Figure 9:
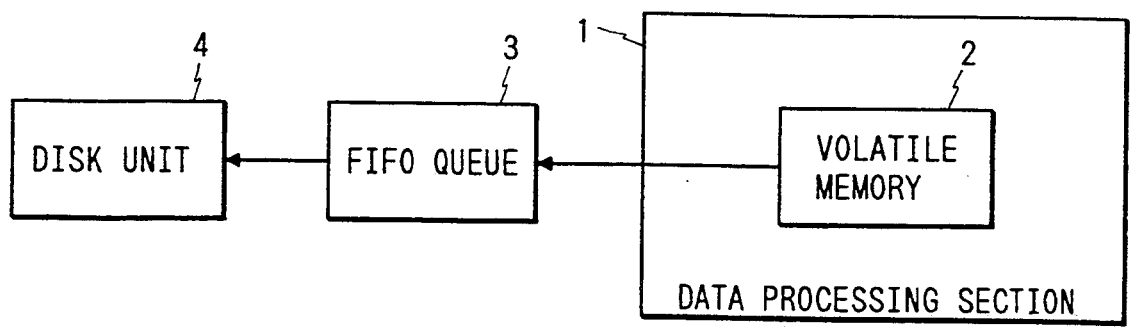
FIG. 9 is a block diagram for a description of a conventional file updating method.

The operation of the second embodiment of the invention is further described with reference to a flow chart shown in FIG. 8.

In Step S10, it is determined whether or not an updating instruction has been issued by the data processing section 1. When it is determined that the updating instruction has been issued, Step S11 is effected. In Step S11, the type of updating operation is identified from the operation code 9 stored in the FIFO queue 3. That is, one of the inserting, removing and updating operations is identified.

In the case where the inserting operation is identified, Steps S12, S13, S14 and S15 are performed. Step S12 is performed to read the amount-of-data information 10 in the FIFO queue 3.

In Step S13, a new file is defined having a size that is large enough to store the original data, for example the above-described data D1 and D2, and the data D to be inserted.

In Step S14, the data D1 is transferred from the original file to the new file.

In Step S15, the data D is transferred from the FIFO queue 3 to the new file.

In Step S16, the data D2 is transferred from the original file to the new file.

In the case where the removing operation is identified in Step S11, Steps S17, S18, S19 and S20 are performed. Step S17 is effected to read the amount-of-data information 10, in the FIFO queue 3, indicating the amount of data to be removed.

In Step S18, a new file is defined having a size that is smaller than the original file according to the amount-of-data information read in Step S17.

In Step S19, the data D1 is transferred from the original file to the new file.

In Step S20, the remaining data of the data D2 that results from removing the amount of data from the data D2 is transferred by the data transferring section 16 from the original file to the new file.

With respect to the operation of Steps S19 and S20, it is noted that the data, identified by the data processing section 1, to be removed could instead be part of the data D1. In such a case, upon performing Step S19, the remaining data of the data D1 that results from removing data from the data D1 would be transferred by the data transferring section 16 from the original file to the new file. In Step S20, the data D2 would be transferred from the original file to the new file.

In the case where, in Step S11, the updating operation is detected, Step S21 is effected. In Step S21, the data D is 20 read from the FIFO queue 3, and is written in place in the original file (no new file is set). That is, new data D is written over the existing data in the original file.

As is apparent from the above description, in accordance with the second embodiment of the invention, only the data necessary for updating is stored in the FIFO queue. Therefore, the file can be updated with a FIFO queue that is relatively small in capacity.

In accordance with the first and second embodiments of the invention, the data formed by the data processing section is stored in the FIFO queue 3 once, and then transferred from the FIFO queue 3 to the file in the disk unit 4, and data is added to the FIFO queue 3 to extend or contract the file, whereby the file size can be changed as required. Hence, the updating operation to add or remove data can be satisfactorily achieved even when a system interruption occurs.

As is apparent from the above description, the invention affords the following advantages and benefits. First, data can be transferred from the data processing unit to the nonvolatile memory in a short time. Hence, the probability is relatively low that a system interruption may occur during the data writing operation. That is, the drawbacks due to a system interruption are substantially eliminated.

Second, in the case where a system interruption occurs while the file is being updated with the data stored in the nonvolatile memory, the data remaining in the nonvolatile memory can be used to continue the file updating operation when the system is subsequently reactivated. Therefore, the data written after the system is reactivated are consistent with those already in the file.

A third advantage afforded by the present invention is that in the case where a file updating operation is accompanied by a data inserting or removing operation, and a system interruption occurs while the file is being updated, the data written when the system is reactivated are consistent with those already in the file.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A disk file control device in which updating data output by a data processing section is stored in a first-in first-out (FIFO) queue including a nonvolatile memory, and is used to update data stored in an original disk file, the updating data having a data structure which includes an operation code representing a type of data operation such as a data inserting, removing or changing operation, amount-of-data information indicating an amount of data to be subjected to the type of data operation, and a file page containing data for writing into a second disk file for updating, said disk file control device comprising:

means, operatively coupled to said FIFO queue, for determining the type of data operation according to the operation code in said data structure;

means, operatively coupled to said type determining means and the disk file, for defining said second disk file, said second disk file having a size approximately equal to a size of said original disk file changed in size according to the determined type of data operation, and by an amount indicated by said amount-of-data information; and means for transferring the data of said original file and the data of said file page of said FIFO queue into said second disk file including:

original data transferring means, operatively coupled to the original disk file, for transferring to said second disk file only that portion of the original data in the original disk file that is not being updated; and means, operatively coupled to said original data transferring means and said FIFO queue, for reading from the file page of said FIFO queue the data to be written into said second file for a data inserting operation.

2. A method for performing a data operation on data stored in an original disk file in accordance with updating data output by a data processing section, said data operation being a data inserting, removing or changing operation, said data processing section storing updating data in a first-in first-out (FIFO) queue having a nonvolatile memory, said updating data having a data structure which includes an operation code, amount-of-data information and a file page, said operation code representing the type of data operation to be performed, said amount-of-data information representing an amount-of-data to be subjected to the data operation, and said file page containing data for writing into a second disk file for updating, said method comprising the steps of:

determining in accordance with said operation code the type of data operation to be performed;

defining said second disk file to have a size approximately equal to a size of said original disk file changed in size according to the determined type of data operation, and by an amount indicated by said amount-of-data information; and transferring data of said original file and the file page of said FIFO queue into said second file including the substeps of:

transferring to said second file only that portion of the original data in the original disk file that is not being updated; and transferring to said second file from the file page of said FIFO queue the data to be written into said second file for a data inserting operation.

* * * * *